United States Patent [19]

Scanlan et al.

[11] Patent Number: 4,747,447

[45] Date of Patent: May 31, 1988

[54] HEAT EXCHANGER

[75] Inventors: Harry J. Scanlan, 3 Cedar Pl., Garden City, N.Y. 11530; Leif Liljegren, 550 Ramapo Valley Rd., Oakland, N.J. 07436

[73] Assignees: Leif Liljegren, Oakland, N.J.; Harry J. Scanlan, Garden City, N.Y.; a part interest

[21] Appl. No.: 476,370

[22] Filed: Mar. 17, 1983

Related U.S. Application Data

[63] Continuation-in-part of Ser. No. 339,858, Jan. 18, 1982, Pat. No. 4,521,674.

[51] Int. Cl.$^4$ .............................................. F28D 15/00
[52] U.S. Cl. .......................... 165/104.34; 165/104.14; 165/47; 165/141; 165/70
[58] Field of Search .............. 165/104.34, 185, 70, 165/104.21, 104.14, 47

[56] References Cited

U.S. PATENT DOCUMENTS

| | | | |
|---|---|---|---|
| 1,409,019 | 3/1922 | Parnell-Smith | 219/299 |
| 1,926,958 | 9/1933 | Peterson | 219/303 |
| 2,196,484 | 4/1940 | Wentworth | 219/461 |
| 2,231,236 | 2/1941 | Wentworth | 219/538 |
| 2,446,367 | 8/1948 | Graves | 219/314 |
| 2,937,923 | 5/1960 | Shapleigh | 165/70 |
| 3,246,634 | 4/1966 | Stevens | 165/104.34 |
| 3,270,802 | 9/1966 | Lindberg | 165/104.34 |
| 3,967,591 | 7/1976 | Iida | 165/104.21 |
| 4,235,283 | 11/1980 | Gupta | 165/185 |
| 4,449,580 | 5/1984 | Reisman et al. | 165/104.34 |
| 4,550,771 | 11/1985 | Arbabian | 165/104.14 |

FOREIGN PATENT DOCUMENTS 1556435 11/1979 United Kingdom ........... 165/104.19

Primary Examiner—Albert W. Davis, Jr.
Attorney, Agent, or Firm—Brumbaugh, Graves, Donohue & Raymond

[57] ABSTRACT

A very simple and inexpensive heat exchanger comprises a closed vessel having thermally conducting walls and helium gas within the vessel. The helium gas is a heat transfer medium between a source of heat or cold and the vessel walls and the vessel walls are a heat transfer medium between the helium gas and a fluid in contact with the walls to be heated or cooled.

7 Claims, 3 Drawing Sheets

HEAT EXCHANGER

This application is a continuation-in-part of U.S. patent application Ser. No. 339,858 filed Jan. 18, 1982, now U.S. Pat. No. 4,521,674 granted June 4, 1985.

FIELD OF THE INVENTION

The present invention relates to the heating or cooling of fluids (liquids or gases) efficiently and rapidly and, in particular, to a heat exchanger suitable for various uses, such as heating water for general use or for space heating.

BACKGROUND OF THE INVENTION

In most cases in which a fluid is being heated or cooled it is kept physically separate from the medium that is supplying heat to it or receiving heat from it by confinement within a vessel or conduit. Likewise, the medium supplying heat to or receiving heat from the fluid is also usually confined to the vessel or conduit. The vessels or conduits or both constitute a heat exchanger.

Most heat exchangers use a tube or a system of tubes as the barrier between the fluid being heated or cooled and the heating or cooling medium. Often it is necessary, in order to maximize the efficiency of the heat transfer, to provide a complicated system of baffles and tubes and to employ tubes that are constructed to enhance the rate of heat transfer, for example, by inclusion of ribs, fins, corrugations or the like. For durability fairly costly metals, such as copper, are often used. The complexity of the structure and the high cost of the materials make efficient, long-lasting heat exchangers very expensive.

Many devices that are in widespread use and employ heat exchangers have relatively low efficiencies. For example, residential furnaces and hot water heaters fueled by natural gas or oil have overall efficiencies of only about 50%. Natural gas and oil fired equipment could be made considerably more efficient using presently available technology in the design of heat exchangers, but only by considerably increasing the complexity and the size of the equipment and making it much more costly.

SUMMARY OF THE INVENTION

There is provided, in accordance with the present invention, a heat exchanger that is of very simple construction and that can, therefore, be manufactured at relatively low cost. It can also provide a substantial improvement in efficiency without substantially increasing the cost, particularly when compared with presently known heat exchangers. More particularly, a heat exchanger, according to the present invention, comprises a closed vessel having thermally conducting walls and helium gas within the vessel, the helium gas being a heat transfer medium in a heat transfer circuit between a source of heat or cold and the vessel walls and the vessel walls being heat transfer media between the helium gas and the fluid.

In one form the vessel of the heat exchanger is tubular in that it has external and internal thermally conducting walls. Either the internal or external wall is the heat transfer medium between the fluid being heated or cooled and the helium gas and the other is a heat transfer medium between the source of heat or cold and the helium gas. For example, the internal wall may serve as a conduit through which a flowing fluid source of heat is conducted and by which heat is transferred to the helium in the vessel.

In another form of the present invention the helium filled vessel is at least partly received within a container. A fluid to or from which heat is to be transferred is supplied through one or more inlets into the container and, having been heated, is removed from one or more outlets remote from the inlet or inlets.

In one embodiment of the present invention the vessel is tubular and includes an internal wall defining a conduit that is adapted to receive a flow of a hot fluid to be cooled. The external wall of the vessel is surrounded by a container wall, thus providing a passage for flow of a fluid to which heat is to be transferred. In this embodiment both the internal and external walls of the vessel containing the helium participate in the heat transfer between the two fluids. Such a heat exchanger is especially useful in equipment in which it is desirable for safety reasons to have a double wall barrier between the two fluids. A hazardous fluid flowing within the internal conduit of the vessel is contained by the outer wall of the vessel if the inner wall should rupture.

The invention may incorporate one or more of the following additional features. Where the heat exchanger vessel is of the tubular form and is employed to transfer heat between a fluid flowing within the internal wall (or conduit) and a fluid flowing along the external wall, the two fluids flow in opposite directions. The conduit of the vessel may have flutes extending inwardly and lengthwise to enhance the heat flux between wall and the fluid flowing along the wall. The vessel may have transverse dividers defining a multiplicity of separate adjacent compartments to prevent circulation of the helium along the length of the heat exchanger and thereby promote a larger temperature gradient along the length.

One important advantage of the invention is that the helium gas in the vessel provides a comparatively high rate of heat transfer. Helium has, among all gases, a very high coefficient of thermal conductivity. Accordingly, heat is transferred very rapidly to the walls of the vessel and thence through the walls into the fluid medium to which the heat is being transferred.

A heat exchanger according to the invention makes it possible to transfer heat from a very high temperature source acting over a fairly small area to a large heat transfer area, namely the external walls of the helium containing vessel. The temperature of the vessel walls from which the heat is transferred to the fluid to be heated is substantially less than the temperature of the source and, indeed, can be designed for optimum heat transfer conditions between the vessel walls and the fluid. For example, effective heat transfer to liquid is best accomplished under temperature conditions under which film boiling does not occur. The inherent ability of the present invention to transfer heat from a high temperature concentrated source to a relatively lower temperature barrier wall of large area with inexpensive equipment is an important advantage.

Helium is very light in weight. While it is possible with metals and some liquids to provide a heat transfer between a concentrated high temperature area and a large surface area the equipment envolved is heavy and expensive. The simple construction and the light weight of heat exchangers embodying the present invention facilitate the manufacture and installation of equipment utilizing the invention.

The invention has numerous uses in both consumer products and industrial products, particularly for heat exchange between fluids at greatly different temperatures, in applications where two or more barriers between the two fluids are required or desirable and where it is desirable to have minimum storage capacity. A particularly important use of a heat exchanger embodying the present invention is in water heating for general use and for space heating for individual residences, apartments, hotels, motels and office and institutional buildings. Hot water heaters utilizing the heat exchanger of the invention are economical to make and easy to install and make possible the use of comparatively small units located close to the place where the hot water will be used. Both capital investment and operating costs can be saved by locating small water heaters in various places in a building, thereby eliminating expensive long distribution systems and the heat losses that occur in such systems.

For a better understanding of the invention reference may be made to the following description of an exemplary embodiment taken in conjunction with the figures of the accompanying drawings.

DESCRIPTION OF THE EXEMPLARY EMBODIMENTS

Figure 1:
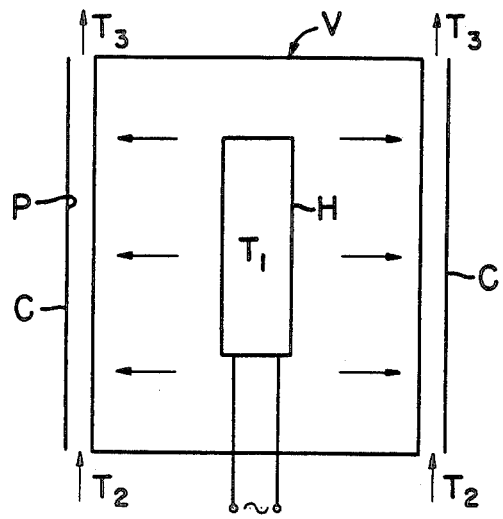
FIG. 1 is a schematic diagram illustrating the principle of operation of a heat exchanger embodying the present invention, as applied to a very simple electric heater.

A very simple form of a heat exchanger embodying the present invention, as shown diagramatically in FIG. 1, is a small electrically energized space heater. It comprises a closed vessel V that is filled with helium gas, preferably at an absolute pressure of about 200 kPa to about 700 kPa (kilopascal). Although the vessel may be of any shape, it is desirable to make it of circular cylindrical shape for ease of manufacture and uniform heat transfer in all directions radially with respect to the central axis. Thus, the vessel V shown in FIG. 1 comprises a circular cylindrical external wall and top and bottom walls. One or more electrical heating elements H are suitably mounted within the vessel. The heating elements may be of very simple low-cost construction, for example, a ceramic support wound with a bare resistance wire heating element. The electrical leads are connected to a source of current.

Upon energization the heating element E reaches a very high temperature T1. The heat is conducted by the helium gas radially outwardly in all directions, as represented by the arrowed lines within the vessel. As mentioned above, helium has a relatively high coefficient of thermal conductivity, as compared to air and other gases. Accordingly, the heat of the heating element is transferred quite rapidly to the walls of the vessel V. In the case of a space heater ambient air from below the heater at a temperature T2 is drawn upwardly by the convective flow induced by the hot walls of the vessel, as represented by the arrowed lines designated T2 in FIG. 2. As the air current flows over the external wall of the vessel, the air is heated to a temperature T3 and rises in the direction represented by the arrows T3. The hot walls of the vessel also radiate heat into the space.

The schematic illustration in FIG. 1 is representative of the basic principle of operation of all heat exchangers embodying the present invention. The helium gas contained in the closed vessel V accepts heat from any suitable source located internally of the vessel, as represented by the electric heating element H in FIG. 1. The internal source of heat may be a hot liquid or gas that is conducted through one or more pipes within the vessel or passing completely through an internal conduit in the vessel. Heat is transferred from the source within the vessel by the helium gas to the external walls of the vessel. The vessel may be partly or entirely enclosed within an outer container C, as represented in FIG. 1 by a circular cylindrical shell having one or more inlets and outlets spaced apart from one another and defining a passage P for a flow of a gas or liquid that is to be heated by the hot walls of the vessel. Accordingly, the invention operates by acceptance by the helium of heat from a source at a temperature T1, the transfer of that heat by the helium to the walls of the vessel and transfer of the heat through the walls of the vessel to a fluid (liquid or gas) flowing in contact with the walls of the vessel, the temperature of the fluid being raised from T2 to T3.

Figure 2:
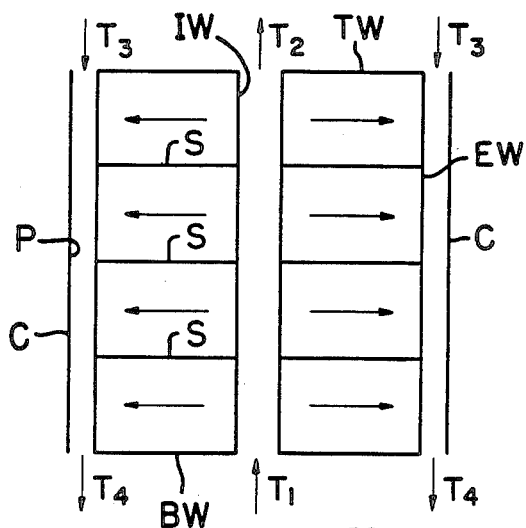
FIG. 2 is another schematic diagram depicting in a generalized way a heat exchanger according to the present invention for transferring heat from a hot fluid to a cold fluid.

FIG. 2 illustrates schematically some preferred characteristics of heat exchangers embodying the present invention, as applied to equipment for transferring heat from a higher temperature liquid or gas to a lower temperature liquid or gas. The helium gas is contained within a tubular vessel which, as mentioned above, may be of any suitable shape but is preferably a circular cylinder. For purposes of the present description, it may be assumed that FIG. 2 depicts a vessel V having a circular cylindrical external wall EW, a circular cylindrical internal wall IW, and annular top and bottom walls TW and BW. The vessel shown in FIG. 2 is, moreover, subdivided into a multiplicity of individual annular chambers by separator plates S suitably joined to the internal and external walls. The separator plates minimize convective heat transfer along the length of the vessel, thus increasing the end-to-end temperature gradient. Accordingly, it is not necessary to have a gas-tight connection between the plates and the walls of the vessel.

A hot fluid at a temperature T1 is introduced into and passes through the passage defined by the internal wall IW of the vessel. Heat is transferred from the hot fluid to the internal wall. Accordingly, the fluid leaves the passage at a temperature T2 below the temperature T1. The heat accepted by the internal wall of the heat exchanger is transferred radially by conduction through the helium gas to the external wall, by convection currents of the helium gas and by radiation. A fluid to be heated is supplied at the cold end of the heat exchanger at a temperature T3, flows along the external wall EW of the chamber and exits the heat exchanger at a higher temperature T4. In most cases the flow of the fluid to be heated is confined by a container C that receives part or all of the helium containing vessel and that is represented in FIG. 2 diagramatically by a cylindrical shell.

An important advantage of the invention is the ability to transfer heat from a very high temperature source to an output heat transfer surface of large area. The heat exchanger inherently distributes heat received over a relatively small area from a high temperature source and distributes the heat over the large area output surface constituted by the external walls of the vessel. In making such distribution, the temperature of the output surface is inherently substantially reduced from the temperature of the source, assuming, of course that heat is transferred away from the output surface of the heat exchanger. The ability of the heat exchanger to distribute heat over a large surface is of advantage in applications of the invention where the cool fluid cannot for one reason or another be subjected to a high temperature, such as chemical degradation, or unwanted vaporization. The heat exchanger can be designed so that the cool liquid is not exposed to a temperature higher than a predetermined safe value.

An example of the usefulness of this characteristic is the space heater described briefly above. A space heater can be designed to distribute the heat input over a large enough area that, given the heat transfer characteristics between the surface of the external walls of the vessel and the air, the external walls do not reach a temperature high enough to be hazardous. Indeed, the outer surface may be kept well below the temperature that would cause severe discomfort to someone who touched the heater.

In the case of most liquids, it is desirable to avoid film boiling of the liquid at the external surface of the vessel. A heat exchanger embodying the present invention can be designed to transfer heat at below the boiling point or within the range of nucleate boiling at the surface.

Figure 3:
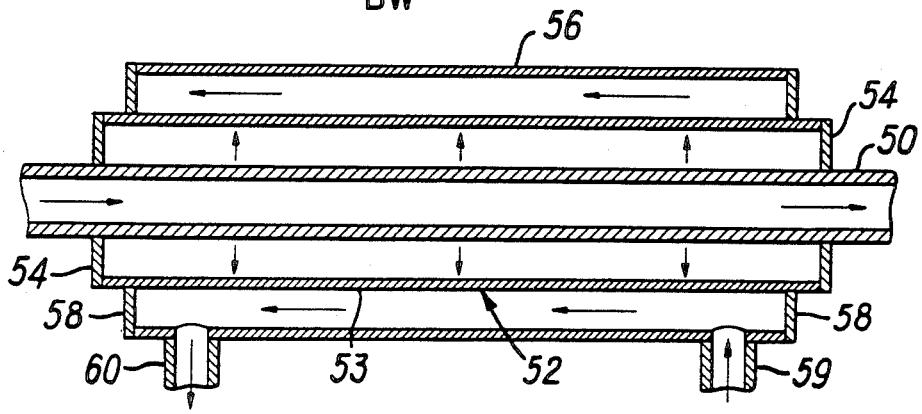
FIG. 3 is a side cross-sectional view of a very simple and inexpensive heat exchanger for pre-cooling a hot refrigerant in a refrigeration system.

Other advantages of the invention are evident from the very simple heat exchanger shown in FIG. 3 of the drawings. A length of pipe 50 defines the internal wall of a tubular closed vessel 52 and serves as a passage for flow of a hot liquid. For example, it is desirable in refrigeration systems to pre-cool the hot compressed refrigerant, such as freon. In order to make efficient use of the heat content of the refrigerant, the cold side of the heat exchanger is potable water used in the building. The heat exchanger in this application is used as a hot water heater to supply part of or all of the requirements of the building for hot water. Building codes require a double barrier between the refrigerant and the potable water, so that if the refrigerant conduit of the heat exchanger ruptured and released refrigerant, a second barrier will prevent the refrigerant from entering the hot water supply. A heat exchanger embodying the present invention meets that requirement.

In particular the tubular vessel 52 provides the required double barrier between the refrigerant and the water by means of the external wall 53 and the conduit 50. The heat exchanger vessel 52 containing helium under pressure is closed at each end by an annular end plate 54 welded at the inner and outer diameters to the internal and external walls. Surrounding the heat exchanger vessel 52 is a container defined by a cylindrical wall 56 and annular end plates 58 welded at the inner and outer diameters to the walls 50 and 53. Water to be heated is supplied to the annular passage defined by the container and surrounding the heat exchanger vessel through an inlet 59, flows through the annular passage, as represented by the arrowed lines, and exits through an outlet 60. Heat is transferred from the refrigerant flowing through the conduit 50 to the helium, the helium transfers the heat to the external wall 53 and the water receives heat from the external wall.

Figure 4:
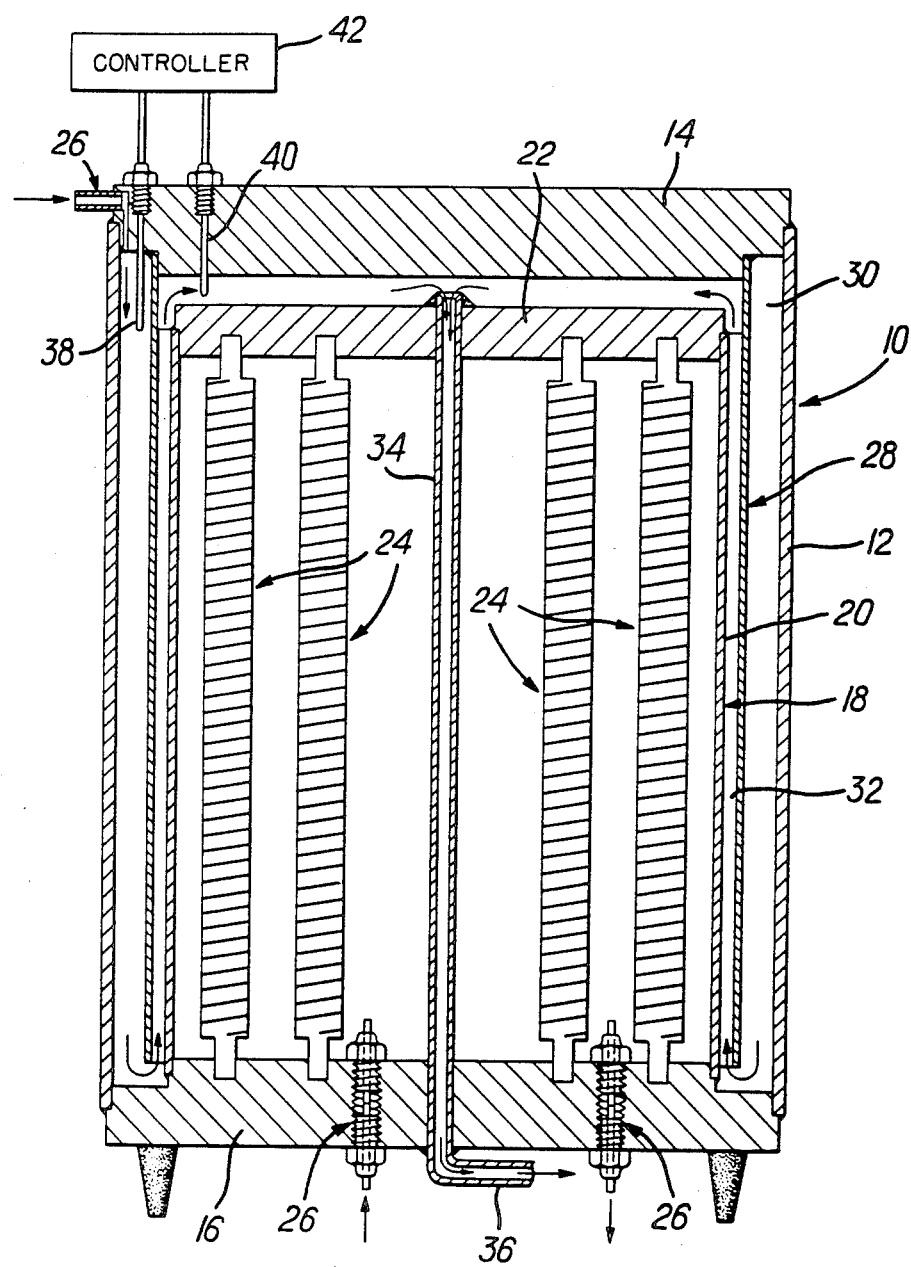
FIG. 4 is a side cross-sectional view of an electric water heater embodying a heat exchanger in accordance with the present invention.

FIG. 4 illustrates the use of a heat exchanger according to the present invention in an electric heater for heating a fluid. It comprises an outer container 10 having a circular cylindrical side wall 12, a top wall 14 and a bottom wall 16. A closed vessel 18, which consists of a circular cylindrical side wall 20, a top wall 22 and the bottom wall 16 of the container, receives any suitable number of electrical resistance heating elements 24. Each heating element comprises a ceramic support and a helical winding of conventional nicrome wire. Preferably, the wires of the heating elements 24 are connected in series by a system of bus-bars (not shown), and suitable electrical connectors 26 conduct electric current to the first element and from the last element in the series. The use of heating elements connected in series enables heavier gage nicrome wire to be used, thereby ensuring long life, but parallel wired elements and the possibility of having two or more groups of series wired elements, with the groups wired in parallel is, of course, entirely feasible. Parallel wired electrical heating elements also present the possibility of providing variable heat output by varying the number of elements that are switched on at any point in time in response to suitable controls.

It is considered preferable for the container 10 and vessel 18 to be entirely of welded construction for assurance against leakage, and this is the case with the embodiment shown in the drawing. It is, nonetheless, envisioned that the heating unit (i.e., the vessel 18 with electrical heating elements 24) can be constructed so that it can be removed from the container 10. There are various ways that will be readily apparent to those skilled in the art as a matter of ordinary engineering skill of making the heating unit removable. For some types of service, notably those in which deposits build up within the container because of the characteristics of the fluid, the ability to remove the heating unit from the container may also be desirable in order to provide access to the container for thorough cleaning from time to time. For service with liquids, it will usually be desirable to provide a valved drain outlet (not shown) in the bottom of the container.

Fluid to be heated is supplied to the container 10 through an inlet 26 in the top adjacent the outer wall 12. A manifold distribution system (not shown) may be interposed between the inlet and the annular space between the side wall 12 of the container and the side wall 20 of the vessel, or multiple inlets can be provided to distribute the incoming fluid relatively evenly around the upper part of the container. The annular space between the walls 12 and 20 is subdivided into an inlet chamber 30 and an outlet chamber 32 by a circular cyclindrical baffle 28 that extends nearly the entire distance from the top wall 14, to which it is welded, to the bottom wall 16 of the container. The fluid entering the inlet 26 is compelled by the baffle 28 to flow down through the inlet chamber to the bottom of the container and then turn and flow upwardly through the outlet chamber to the top of the container. The then heated fluid flows radially inwardly toward the axis of the container and enters a outlet pipe that extends vertically through the vessel 18 and exits through the bottom wall 16 of the container to an outlet 36.

The vessel 18 contains helium gas at a suitable pressure, preferably in the range of from about 200 KPa to about 700 KPa. The vessel 18 may be, but need not be, evacuated before being charged with helium. The helium atmosphere within the vessel provides for rapid transfer of heat from the electrical resistance heating elements 24 in the vessel to the walls of the vessel 18 and the pipe 34.

As the fluid entering the inlet 26 flows down through the inlet chamber 30 between the baffle 28 and the wall 12 of the container it is gradually preheated, inasmuch as the fluid flowing up through outlet chamber 32 flows in direct contact with the hot outer wall 20 of the vessel and transfers some of the heat it receives from the vessel wall out to the baffle which, in turn, transfers it to the fluid flowing through the inlet chamber. The fluid flowing up along the hot outer wall 20 of the vessel is rapidly heated in the relatively thin channel defined between the wall 20 and the baffle 28. The wall 20 provides a very large surface area to which heat is transferred from a suitable number of heating elements 24 within the vessel very rapidly by the helium atmosphere. Thus, the heater is ideally suited for substantially instantaneous heating of a fluid. Heat losses from the heater are kept to a minimum, because the incoming fluid provides an insulating barrier. Inasmuch as heat transfer is a function of the difference in the temperatures on opposite sides of a barrier, the loss of heat through the outer wall 12 is kept low because the incoming fluid is only slightly heated, as compared to the much higher temperature of the fluid flowing through the outlet chamber. This natural barrier of the incoming fluid in the chamber 30 contributes to the high efficiency of the unit.

It is preferable for the outlet chamber to be very thin in order to promote turbulant flow of the fluid, and the turbulence and the surface area may be increased by providing a corrugated outer wall on the vessel, or by providing fins or other devices for promoting turbulence.

Upon reaching the top of the outlet chamber 32, the fluid flows inwardly across the top of the vessel, where it receives additional heat, and then passes through the outlet pipe 34, again receiving heat from the wall of the pipe to which heat is rapidly and effectively transferred by the helium atmosphere within the vessel.

The heating elements 24 may be controlled by any suitable thermostatic control system, preferably one which measures temperature of the incoming fluid near the inlet by means of a thermo-couple 38, measures the temperature of the fluid after it has been substantially heated, such as by a thermo-couple 40, and turns the elements 24 on and off in accordance with some integrated value that takes into account both incoming and outgoing temperatures. Many such systems are known in the art and are shown schematically in the drawing by means of the block 42 labelled "controller." The ability of the helium atmosphere within the vessel to transfer heat rapidly to the walls along which the fluid passes and by which the fluid is heated improves the response rate of the control system.

The embodiment illustrated in the drawing is an instantaneous type unit, inasmuch as it has virtually no storage capacity. It can be controlled to maintain the temperature of the fluid in the region of the thermo-couple 40 somewhat heated but not heated to the output temperature. When fluid is demanded from the outlet 36, the thermo-couple 38 detects a drop in temperature and the controller 42 switches on the heating elements 24. In a matter of a few seconds the helium atmosphere within the vessel begins transferring heat from the heating elements to the wall 20 and the pipe 34, and the fluid flowing from the outlet becomes rapidly hotter until it attains a desired temperature. The heating element is then controlled primarily by the thermo-couple 40 to cycle the heating elements on and off and maintain a fairly constant temperature of the fluid coming from the outlet 36. When fluid is no longer drawn from the heater, the thermo-couple 38 will detect an increase in temperature indicative of the fact that cold fluid is no longer entering through the inlet 26, and such indication is processed in the controller 42 and shuts off the heating elements.

The embodiment of FIG. 4 is applicable to storage type liquid heating equipment, which equipment may incorporate designs known in the prior art insofar as temperature control, possible recycling of fluid from the container through the heater and similar design factors. It is also well-suited for heating process gases, as is a unit having pipes or ducts that pass through the space within the vessel. The side of wall the vessel may be corrugated in the longitudinal direction for greater strength and surface area for a given overall size and weight.

Figures 5, 6:
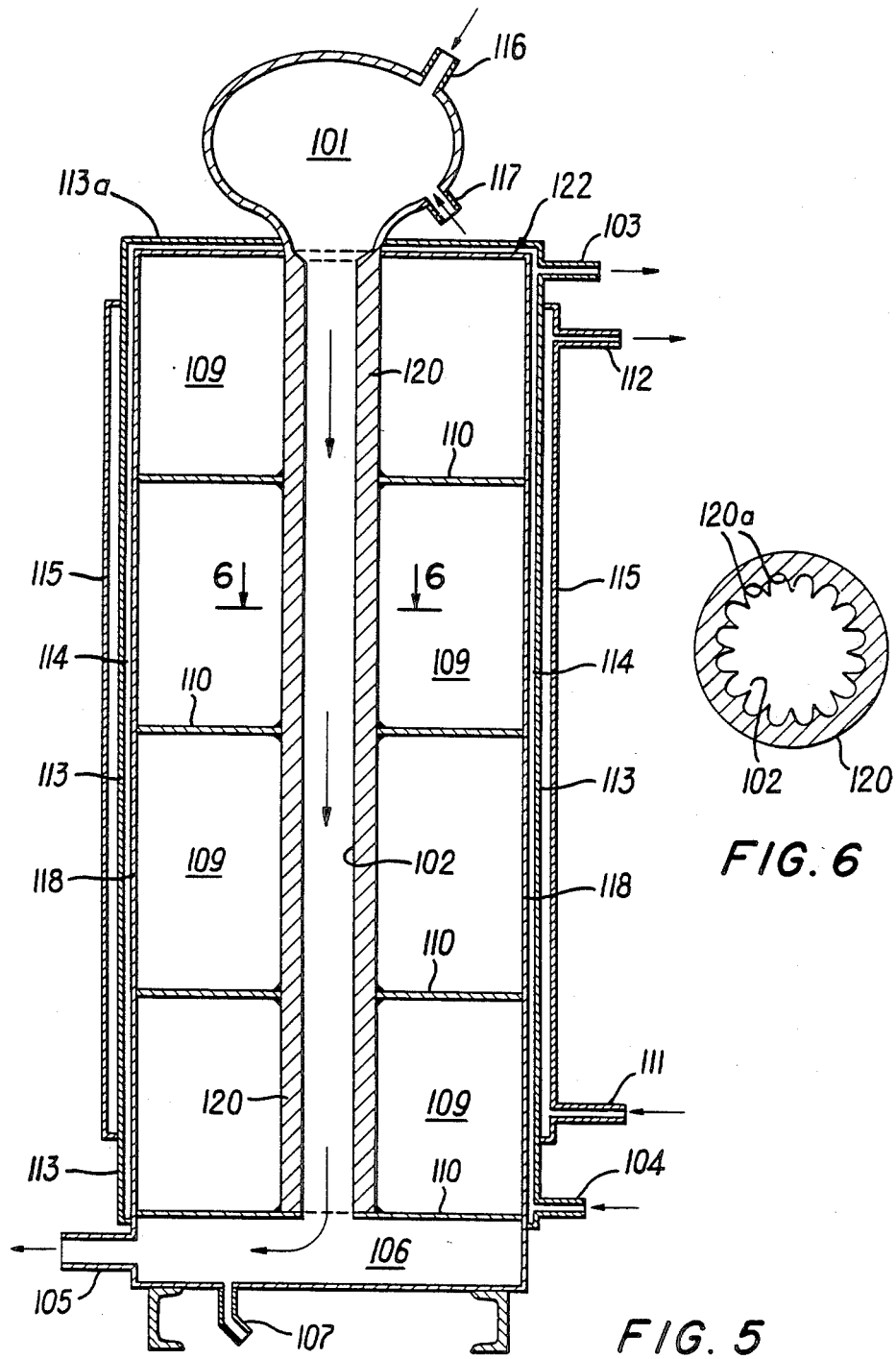
FIG. 5 is a side cross-sectional view of a gas-fired hot water heater that employs a heat exchanger according to the present invention.
FIG. 6 is a fragmentary cross-sectional view of the internal wall of the heat exchanger shown in FIG. 5.

FIGS. 5 and 6 also illustrate a fluid heater that employs a heat exchanger constructed in accordance with the present invention. The heater comprises a pulse-type combustion chamber 101 of a type that is known per se. Air is injected through an inlet 116 to the chamber 101, and natural gas is injected through the inlet 117. An igniter initiates an explosion of the fuel-gas mixture in the chamber. The force of the explosion drives the hot combustion products out of the chamber and down through a passage 102 defined by the internal wall 120 of a closed vessel 122. The vessel has a circular cylindrical outer wall 118 and is subdivided into a multiplicity of annular compartments by plates 110. The vessel can be assembled by welding the plates 110 to the inner wall 120 and then sliding the outer wall 118 onto the welded inner assembly. If desired, seals can be installed between the outer perimeters of the plates 110 and the outer wall 118, though it is probably unnecessary to do so inasmuch as the purpose of the plates is only to inhibit convective flow of helium gas within the vessel 122 and thereby increase the temperature gradient along the length of the heat exchanger.

The hot combustion products flow down from the combustion chamber 101 through the passage 102 in a state of very high turbulance, due to the explosive force by which they are propelled. To enhance the heat transfer between the hot combustion products and the internal wall 120, the internal surface of the wall 120 is fluted, as shown in FIG. 6. In addition, the wall 120 is of fairly large cross-sectional thickness so that it acts as a heat sink for heat received from the hot gases so that heat is stored in the wall during periods between the combustion pulses. The hot gases of combustion are rapidly cooled as they flow down through the passage 102 and reach the bottom at a relatively low temperature. Condensate from the combustion process is collected in an exhaust plenum at the bottom of the heater and drains through an outlet 107, through a trap (not shown) and then to a waste line. Exhaust gases exit through an outlet 105.

The vessel 122 is surrounded on the sides and top by a container having a cylindrical side wall 113 and an annular top wall 113a. The container defines with the exterior of the vessel 122 a thin passage 114. A fluid to be heated is introduced through an inlet 104 to the chamber 114. As the fluid flows upwardly through the chamber, it receives heat from the large surface area of the hot external wall 118 of the vessel, which in turn rapidly receives heat from the internal wall 120 transferred through the helium to the external wall. Hot fluid is discharged from the heater through an outlet 103.

A second tubular closed container 115 partly surrounds the inner container 113. Fluid is delivered to an inlet 111 to the annular passage within the container 115 and receives heat by transfer from the fluid in the passage 114 through the wall 113. Thus, the fluid in the outer container is also heated as it passes up the annular chamber, and hot fluid is discharged through an outlet 112.

A highly advantageous use for the fluid heater shown in FIGS. 5 and 6 is as a combined furnace and hot water heater. Hot water produced by the inner chamber and delivered through the outlet 103 can be distributed to hot water convectors throughout the space being served by the furnace, this water being at a relatively high temperature. The water discharged through the outlet 112 will be at a somewhat lower temperature, particularly when there is a demand for both heating water and hot water for general purpose use in the building. The systems can be operated simultaneously or separately under the control of suitable thermostatic controls for the burner. When there is no demand for heat, water in the inner container does not circulate and functions merely as a heat transfer medium to transfer heat from the vessel to the outer container, so less input heat is needed.

The fluid heater shown in FIGS. 5 and 6 can be modified to employ a pulse combustion burner unit located at the bottom. In addition, other types of fuel burners can be substituted for the pulse combustion unit. Among the advantages of this unit is the simplicity and resulting low cost of making it and comparatively high efficiency, especially with a pulse combustion unit which enables substantially all of the heat content of the fuel to be transferred so that very little heat goes out with the exhaust combustion gases.

The above-described embodiments of the invention are intended to be merely exemplary, and numerous variations and modifications will be apparent to those skilled in the art without departing from the spirit of the scope of the invention. All such variations and modifications are intended to be included within the scope of the invention, as defined in the appended claims.

We claim:

1. A heat exchanger comprising a closed tubular vessel having thermally conducting peripheral walls and thermally conducting internal walls, helium gas within the vessel at a pressure of not less than about 200 kPa absolute, means for supplying heat to the vessel internal walls, whereby the internal walls transfer heat to the helium gas in at least one region thereof remote from the vessel peripheral walls, bounding walls including a wall closely spaced outwardly from and surrounding the vessel peripheral walls and defining with the vessel peripheral walls a chamber adapted to receive a dischargeable fluid to be heated, at least one inlet to the chamber adapted to admit said fluid into the chamber, and at least one outlet from the chamber spaced apart from the inlet and adapted to discharge said fluid from the chamber to establish a fluid flow therethrough, the inlet and outlet being located such that fluid flows through the chamber along a path that is continuously closely adjacent the vessel peripheral walls, whereby the helium gas transfers heat to the vessel peripheral walls which in turn transfer heat to the fluid flowing through the chamber.

2. A heat exchanger according to claim 1 wherein the heat supplying means supplies a flow of a fluid source of heat and the vessel internal wall is a portion of a conduit that is adapted to receive the flowing source of heat.

3. A heat exchanger according to claim 2 wherein the inlet and outlet of the chamber are located to provide a flow of the fluid to be heated through the chamber in a direction opposed to the flow of the flowing source of heat through the conduit portion.

4. A heat exchanger according to claim 2 wherein the vessel internal wall has flutes extending inwardly and lengthwise to exchange the heat flux between the flowing fluid source of heat and the vessel internal wall.

5. A heat exchanger according to claim 1 wherein the vessel has transverse dividers defining a multiplicity of separate adjacent compartments in the vessel to promote a large temperature gradient along the path of flow of the fluid to be heated through the chamber.

6. A heat exchanger comprising a tubular vessel having thermally conducting peripheral walls and thermally conducting internal walls, helium gas within the vessel at an initial pressure at ambient temperature of not less than about 200 kPa absolute, and means for supplying head to the vessel internal walls, whereby the internal walls transfer heat to the helium gas in the vessel in at least one region thereof remote from the vessel peripheral walls, the vessel being closed to prevent expansion of the contained helium gas as it is heated and to prevent circulation of the helium gas other than by natural convection, whereby the helium gas is a heat transfer medium between the heat supplying means and the vessel peripheral walls and the heat is distributed without forced circulation to the vessel walls by the helium to heat the vessel peripheral walls to a predetermined temperature for heating a fluid outside the vessel.

7. A heat exchanger according to claim 6 wherein the heat supplying means supplies a flow of a fluid source of heat and the vessel internal wall is a portion of a conduit that is adapted to receive the flowing fluid source of heat.

* * * * *